(12) United States Patent
Ntounas

(10) Patent No.: US 8,555,804 B2
(45) Date of Patent: Oct. 15, 2013

(54) ILLUSTRATED GUIDE FOR THE IDENTIFICATION OF ORGANISMS IN THE FIELD

(76) Inventor: Konstantinos Ntounas, Heraklion (GR)

( * ) Notice: Subject to any disclaimer, the term of this patent is extended or adjusted under 35 U.S.C. 154(b) by 397 days.

(21) Appl. No.: 12/926,575

(22) Filed: Nov. 26, 2010

(65) Prior Publication Data
US 2011/0136091 A1 Jun. 9, 2011

(30) Foreign Application Priority Data

May 29, 2008 (GR) .................................. 080100366

(51) Int. Cl.
*G09B 19/00* (2006.01)
*G09B 23/00* (2006.01)

(52) U.S. Cl.
USPC ............ 116/306; 116/307; 116/323; 434/295

(58) Field of Classification Search
USPC .......... 116/306, 307, 309–324, 334; 434/295, 434/296
See application file for complete search history.

(56) References Cited

U.S. PATENT DOCUMENTS

| | | | | |
|---|---|---|---|---|
| 3,485,204 A | * | 12/1969 | Christman | 116/324 |
| 3,902,450 A | * | 9/1975 | Bosshold | 116/323 |
| 4,197,810 A | * | 4/1980 | LeMasson | 116/323 |
| 4,619,221 A | * | 10/1986 | Linstromberg | 116/307 |
| 5,360,345 A | | 11/1994 | Brauner et al. | |
| 8,316,790 B2 | * | 11/2012 | Coon | 116/324 |
| 2002/0113426 A1 | * | 8/2002 | Lang | 281/15.1 |
| 2003/0017441 A1 | * | 1/2003 | Greco | 434/276 |
| 2004/0174009 A1 | | 9/2004 | Mark | |

FOREIGN PATENT DOCUMENTS

DE 4114945 A1 * 2/1992
JP 2011252651 A * 12/2011

* cited by examiner

*Primary Examiner* — R. A. Smith

(57) ABSTRACT

Illustrated guide for the identification of organisms in the field comprising at least one sheet (23) whereupon has been printed a plurality of images (14) of organisms that are encountered in the field and a corresponding plurality of marking mechanisms (16) arranged adjacently to each one of the images (14), each marking mechanism (16) comprising a movable member (28) supplied with a pointer (19) that is being shifted by the user during his visit in the field in order to indicate through pointing at an indication (21) characteristic of the presence of the specific organism in the field, such mechanisms thereby being employed for the recordal and storage of the observations of the user relating to those organisms depicted in the illustrated guide for which the adjacently arranged marking mechanisms (16) have been shifted to point at the indication (21).

10 Claims, 5 Drawing Sheets

ILLUSTRATED GUIDE FOR THE IDENTIFICATION OF ORGANISMS IN THE FIELD

THE FIELD OF THE ART

The invention refers to an illustrated guide for the identification of organisms in the field that comprises a marking mechanism arranged adjacently to each one of a plurality of images printed on the guide, said images depicting a variety of organisms-targets, where the proposed marking mechanisms are employed by the user for the direct recordal of his recognizing of the presence of specific organisms-targets during his visit in the field.

THE BACKGROUND OF THE INVENTION

A series of products is presently commercially available with a special scope of application in the marine environment, such products being used for the in situ identification of specific marine organisms, either by divers equipped with autonomous scuba diving devices or by swimmers carrying a mask of underwater observation and a common snorkel. These products are usually of two types.

The first type is related to simple, flexible cards of plastic material of a relatively small thickness, such cards being printed on either side thereof with illustrations or photos of various marine organisms, such as by way of example of species of algae, plants, invertebrate and vertebrate animals. Printing is currently made by means of various modern printing methods ensuring an optimally high definition of the displayed organisms, e.g. offset type printing. Special printing inks are employed that are adequately resistant to the negative effect of exterior conditions, such as temperature fluctuations, ultraviolet radiation, etc., thereby providing an appropriately long duration of the prints. An eventual full water-proof quality of the cards is obtained by means of either plasticizing techniques or through the employment of special colors and printing techniques. The common name or the official name of the species is written adjacently each one of the depicted organisms in accordance with the current international scientific nomenclature norms of the Kingdoms of Animals and Plants. A pertinent, often composite, title is printed on the upper part of each card, such title referring to the group or the groups of organisms that are being depicted and at the same time to the geographical area where these organisms are being encountered, e.g. coastal fishes of Hawaii (www.fishcards.com, Hawaii Fishwatcher's Field Guide). In some cases the cards include, together with the illustrated organisms, geographical maps, under a scale that appropriately displays the underwater geological relief and the type of the seabed of a specific coastal area, e.g. a marine park, that can also include parts of the coast and/or of the adjacent land, as well as informative material such as toponyms, locations of ship wrecks, areas with artificial reefs, areas where recreational scuba diving is permitted, etc.

A second type of products presents the same features, the only difference being that the illustrated section with the marine organisms or the supplementary informative material is laid out on a plurality of pages, thereby such product being provided in the form of a water-proof book. By way of example, U.S. Pat. No. 7,121,587 discloses a wearable book comprising a plurality of pages with displays of marine organisms that is retained on the hand of the user-diver by means of an elastic loop. The pages of this illustrated guide are either perforated in two or more points along one side thereof and they are retained to one another by means of a foil, e.g. of spiral type, or are being connected in only one point thereof on their upper left end. This connection is effected in a way that allows free movement of each page separately from the others and perpendicularly to the axis that passes through the binding point of the pages. In some cases the pages are simply connected to one another by means of water-proof glue or they are simply folded in the middle.

Mostly due to the aggravation of global environmental problems and the publicity related to such problems by the mass media, an increasing sensitivity of the public is presently observed on issues related to the conservation and the protection of the biodiversity at a local, as well as at an international level. This general trend has resulted in the direct observation of the marine biodiversity with the use of an autonomous scuba diving device or even by means of a simple mask and snorkel becoming a favorite recreational activity for the visitors of the coastal zone, mostly during the period of their summer holidays. However, the in situ identification of marine organisms with the assistance of the above-mentioned simple water-proof illustrated cards for the identification of organisms of the prior art is an extremely difficult procedure, especially if the amateur involvement of the majority of users in the activity of identification of organisms and their reasonably expected minimal knowledge on scientific fields, such as Biology, Zoology, Botanics, Systematics, Biogeography, etc. is taken into account.

This difficulty is due to the fact that an average person can normally merely temporarily store in his short term visual memory a particularly small number of items or otherwise visual information items. It has in the past been considered that the average potential of storage of visual information in the short term memory amounts at a total of 7±2 distinct information items (G. A. Miller, 1956, "The Magical Number Seven, Plus or Minus Two: Some Limits on Our Capacity for Processing Information", *The Psychological Review*, vol. 63, pp. 81-97). However, modern scientific observations (for instance: Alvarez and Cavanagh, 2004. *Psychological Science*, vol. 15, No. 2, pp. 106-111) show that the upper limit of storage of items in the short term visual memory of an average observer is even less and moreover that this limit depends on the visual information load that is contained in the various items being observed. In any case modern experimental data show clearly that the maximum number of items that can be memorized in the short term visual memory of a normal (average) person usually does not exceed 4 to 5 different items.

According to the above, it is rather difficult for an amateur observer of marine life, either as a scuba diver or as a common swimmer with a mask and a snorkel, to retain in his memory the organisms that he encounters during a visit of his in the natural environment. In addition, it is not always easy for him to identify directly and with certainty the organisms that he observes in the field and to relate the same with the organisms depicted in the illustrated guide for the identification of organisms that he may be provided with. It must be noted that the number of merely the common species of marine organisms, e.g. fish, that are potentially encountered in a certain coastal area and are usually included in the aforementioned water-proof illustrated guides for the identification of organisms of the prior art is quite large and usually it ranges from 40 to 80 or even more different species. The large variety of biological species that live in a certain bio-geographical area in combination with the almost complete lack of familiarization of the average recreational swimmer or scuba diver with scientific knowledge, techniques and methods of taxonomy and more generally with the Sciences of Zoology and Botanics, constitute major obstacles in memorizing and therefore in learning to identify such a variety of these species. This leads to frustration of the users of the available prior art products of illustrated cards for the identification of organisms in the field and to their discouragement from further use and promotion of such products.

It is the object of the present invention to overcome the above mentioned problems through providing an illustrated guide for the identification of organisms-targets in the field, such guide being equipped with a special marking mechanism for each one of the illustrated organisms-targets, such marking mechanism appropriately allowing the direct and active marking by the user of those organisms that he recognizes with certainty in the field.

It is a further object of the invention to provide the user with the capacity to employ his personal judgment in marking with the use of the above mentioned marking mechanisms potentially different degrees of certainty related to the recognition in the field of the illustrated organisms-targets being recorded by means of the aforementioned corresponding marking mechanisms, through displacement of a pointer means of the corresponding marking mechanism in a position that indicates the specifically designated degree of certainty in each particular case.

A further object of the invention is to provide a method of providing information and training in relation to organisms encountered in a certain field, such method comprising employment of the herein proposed illustrated guide for the identification of organisms encountered in the field with a scope of recordal and storage, by means of the aforementioned marking mechanisms incorporated therein, of the visual observations of the user during his visit in the field and the subsequent research of further information related to the identified organisms after the visit by means of suitable information resources (e.g. special editions, electronic media, interne, etc.) so that the user may acquire skills in handily and accurately identifying these organisms during his future visits in the field.

A final object of the invention is to provide a system of providing information and training in relation to organisms encountered in a certain field, such system comprising printed and/or electronic media of information related to these organisms and may have an interactive character so that the user can cross-check the information collected and stored during his visit in the field by means of the abovementioned marking mechanisms with the corresponding information resources in due course. Consequently, the proposed system provides an added value in the recreational activity and at the same time contributes towards enhancing the sensitivity of the user on issues related to environmental conservation and protection of the biological diversity.

BRIEF DESCRIPTION OF THE DRAWINGS

The invention will become fully apparent to those skilled in the art by reference to the accompanying drawings in which are being presented illustrative preferred embodiments of the same.

DETAILED DESCRIPTION OF PREFERRED EMBODIMENTS

Referring now to the accompanying drawings we will describe illustrative, preferred embodiments of the invention, which are provided by way of example aiming exclusively at the explanation of the invention and therefore do not limit the scope of application of the invention.

Figure 1:
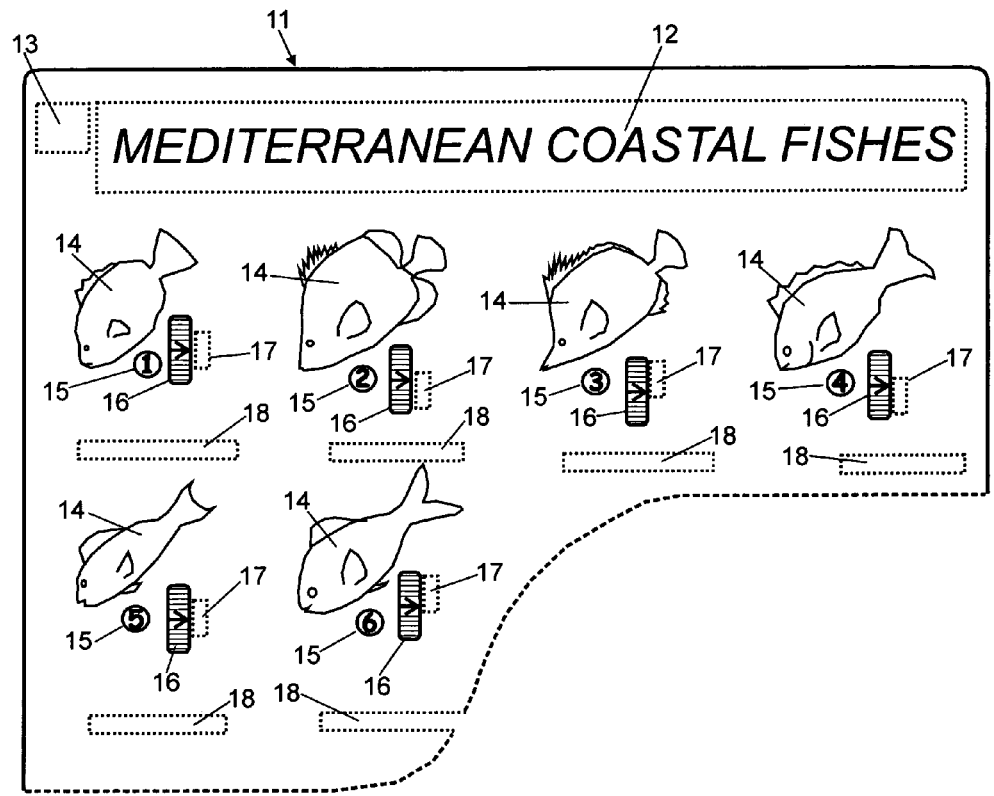
FIG. 1 presents a frontal view of a portion of a sheet whereupon have been printed images of a variety of organisms encountered in the field with marking mechanisms corresponding to each one of the depicted images in accordance with the present invention.

FIG. 1 shows a general view of a first embodiment of the invention that depicts a frontal view of a double sided illustrated card for the identification of organisms, provided with marking mechanisms for the recordal and storage of observations of the user related to identified organisms in the field. More specifically, FIG. 1 shows a water-proof card 11 employed in the identification of the organisms illustrated in images 14. Card 11 comprises column 12 on the upper part thereof wherein is entered a reference label of the thematic title of the card. In the case of this specific example the label inserted in column 12 reads "Mediterranean Coastal Fishes". Card 11 further comprises a box 13 on the upper left corner thereof whereupon codified information is given related to the side of the card that the user sees (for instance A or B side) and/or the serial number of the specific card in case that there are more than one cards for the identification of organisms of one or more specified areas, etc.

The different organisms depicted in images 14 displayed in the card can be arranged in rows, as in the example of FIG. 1, or they might be randomly spread on the overall surface or on a specific portion in one or in both sides of card 11. Each image 14 of an organism is denoted by a specific type of codification inserted within box 15 underlying the illustrated organism, such codification being by way of example a mere serial numbering. This codification plays the role of an index, assisting the user in handily locating additional information from other resources related to the organisms encountered in the field. These information resources may be special editions, printed or electronic (e.g. CD ROM, DVD, web pages, etc.) directly linked and interactive with the guide for the identification of organisms in the field being described in the present invention.

Next to each image 14 of an illustrated organism is being depicted the upper movable part of a marking mechanism 16 that, as will be shown in detail hereinafter, can be moved by the user in successive positions corresponding to the codified depictions included within a column 17 immediately adjacent to the marking mechanism 16.

According to an illustrative preferred embodiment of the invention, a column 18 is provided underneath each image 14 of the displayed organisms, wherein is being entered the common name of the depicted organism in one or more languages and/or the scientific name thereof according to the official International Nomenclature Codes.

Figure 2:
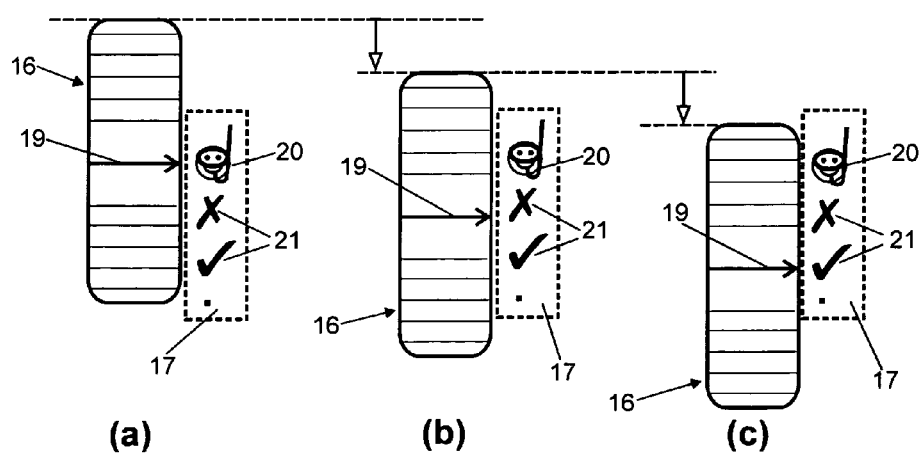
FIG. 2 presents three different positions of one of the marking mechanisms of FIG. 1.

FIG. 2 shows three different phases (a, b and c) of the displacement of the upper movable part of a marking mechanism 16 initiated by the user of card 11. Each marking mechanism includes a pointer 19 in the form of an arrow directed towards an adjacent column 17 wherein codified indications of different positions of the mechanism are being provided.

Whilst in the first phase (a), the marking mechanism is positioned at an initial idle position indicated by the pointer 19 pointing at an indication 20 containing a graphic that is given exclusively and only in the form of example. In the second phase (b) the pointer 19 comes, following an active movement of the marking mechanism 16 initiated by the user of the card, at a position 21 characteristic of the specific organism depicted in the image 14 adjacently to this marking mechanism having been identified in the field. It is through this active displacement of the marking mechanism by the user of the card that his observation of the specific organism in the field is recorded and stored. According to an illustrative preferred embodiment of the invention, column 17 includes more than one positions 21, adjacently to each marking mechanism 16, characteristic of the specific organism depicted in the image 14 having been identified in the field. By way of example more than one positions 21 may correspond to the indication of different degrees of certainty of a specific observation, so that in case where the user of the card considers that he is absolutely certain of recognizing the presence of a specific organism in the field, he moves pointer 19 to the second one of the two positions 21, as displayed in the third phase (c). At this point it must be noted that prior to starting using the guide for the identification of organisms in the field all the necessary guidelines have been provided to the user.

Figure 3:
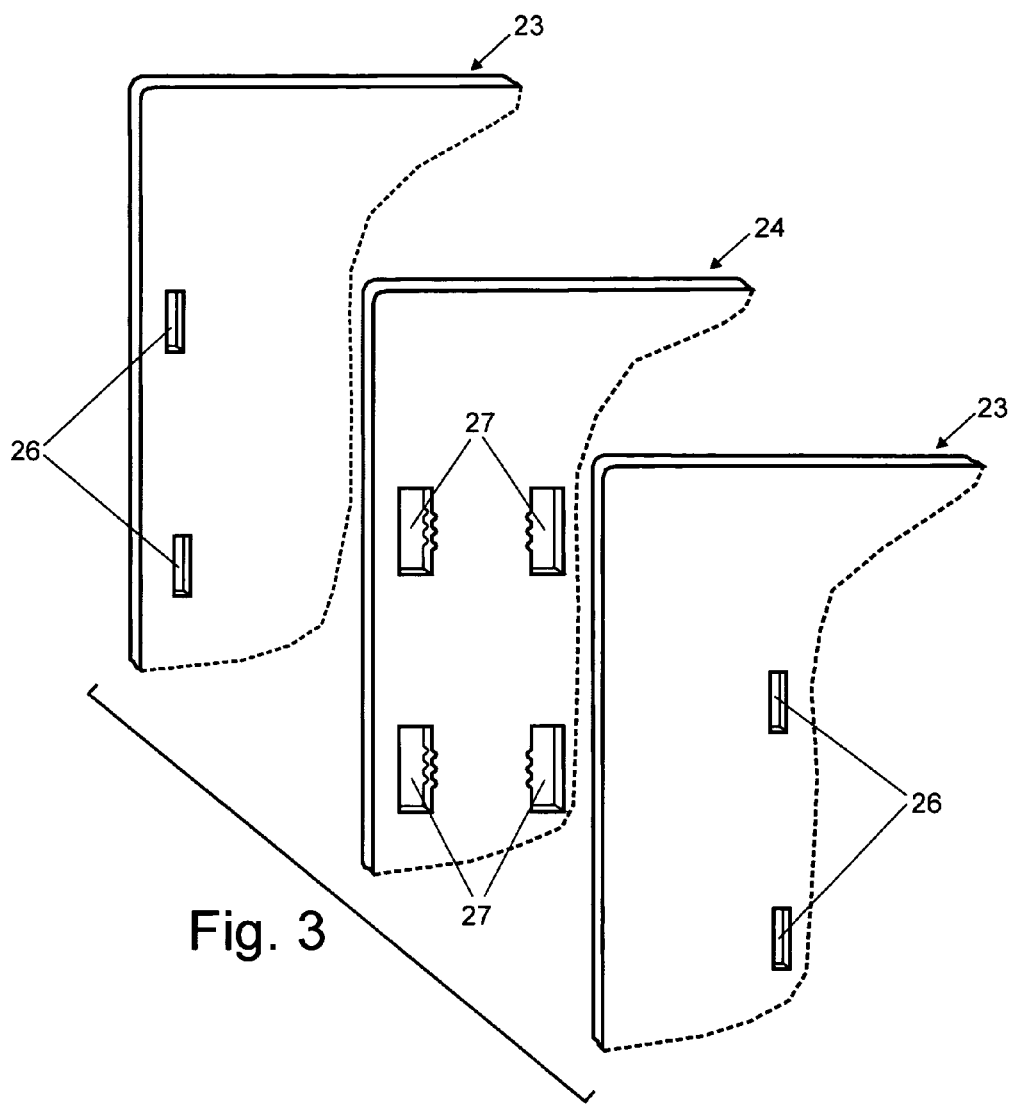
FIG. 3 presents a side general view of a portion of the illustrated guide for the identification of organisms in the field of the present invention, dismantled into its three constituent sheets according to a first illustrative preferred embodiment of the invention without the movable parts of the marking mechanisms employed in the recordal and storage of identified organisms.

As shown in FIG. 3, according to a first illustrative embodiment of the invention, the guide for the identification of organisms in the field consists of a pair of equally sized sheets 23 and an intermediate sheet 24. All sheets have a small thickness and are fixedly connected to one another during the procedure of final assembling of the guide. For simplification reasons the illustrations described in detail and explained in FIGS. 1 and 2 are not displayed on the external surface of the card. The two exterior sheets 23 have through holes 26 of a rectangular shape, which during connection of the two sheets 23 and the intermediate sheet 24 come in alignment with one of an arrangement of rectangular shaped holes 27 of a special type that are provided onto the intermediate sheet 24.

Figure 4:
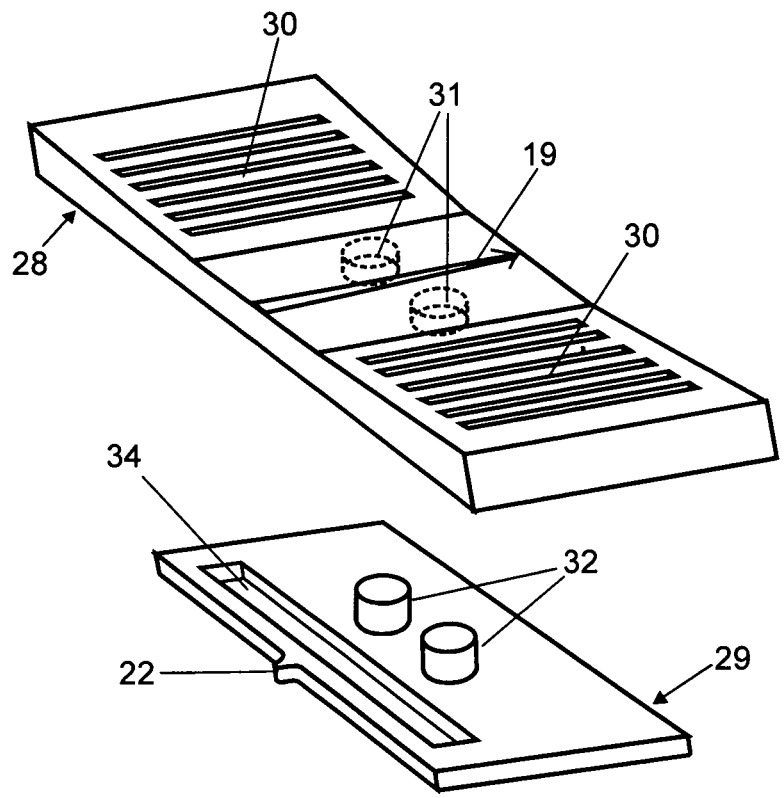
FIG. 4 presents the marking mechanism in accordance with a first illustrative preferred embodiment of the invention dismantled in the constituent parts thereof.
Figure 5:
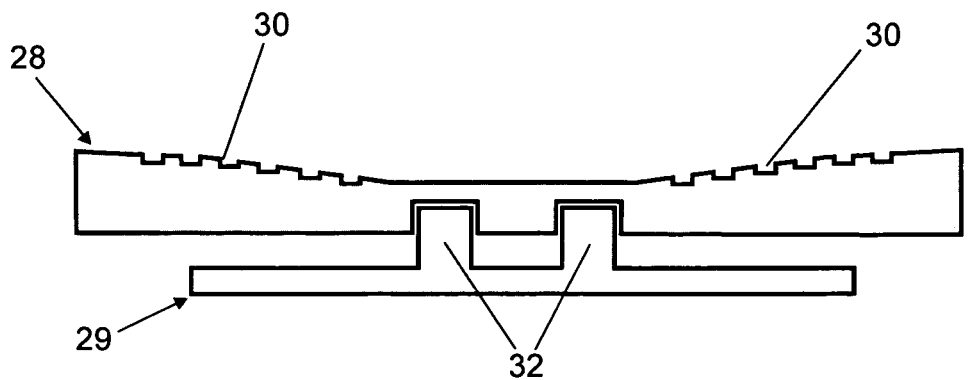
FIG. 5 presents a cross sectional view of the assembled marking mechanism of FIG. 4.

FIG. 4 shows the two components that comprise the marking mechanism 16 in a dismantled condition. The first component 28 has a shape that resembles with a rectangular parallelepiped of a relevantly small thickness. The upper surface of the component 28 is the one that comes into contact with the fingers and usually with the thumb of the user of the guide for the identification of organisms. The abovementioned pointer 19 is located in the middle of this upper surface and, in the specific example, it has the form of an arrow. On either side of pointer 19, the same upper surface of the component 28 is provided with an array of shallow, parallel to one another, grooves 30, the scope of which is to facilitate active displacement of the mechanism by the user. Pointer 19 can be seen clearly by the user of the card because of its different coloring or its embossed shape or a combination of both the above and/or other characteristics. A pair of equally sized recesses of cylindrical shape 31 is provided at the bottom of the movable component 28. The second component 29 of the marking mechanism has the shape of a rectangular parallelepiped of small thickness that is provided with a longitudinally extending through opening 34 of small width along a lateral side thereof. In the middle and externally of the same side there is provided a protrusion of curved shape 22 of relatively small dimensions. Finally, a pair of protrusions 32 of cylindrical shape is centrally located at the upper surface of the component 29, such protrusions 32 having such dimensions and layout so that they may be partially inserted precisely within the corresponding cylindrical recesses 31 provided onto the bottom surface of the first component 28 of the marking mechanism 16 as shown in the sectional view of FIG. 5.

Figure 6:
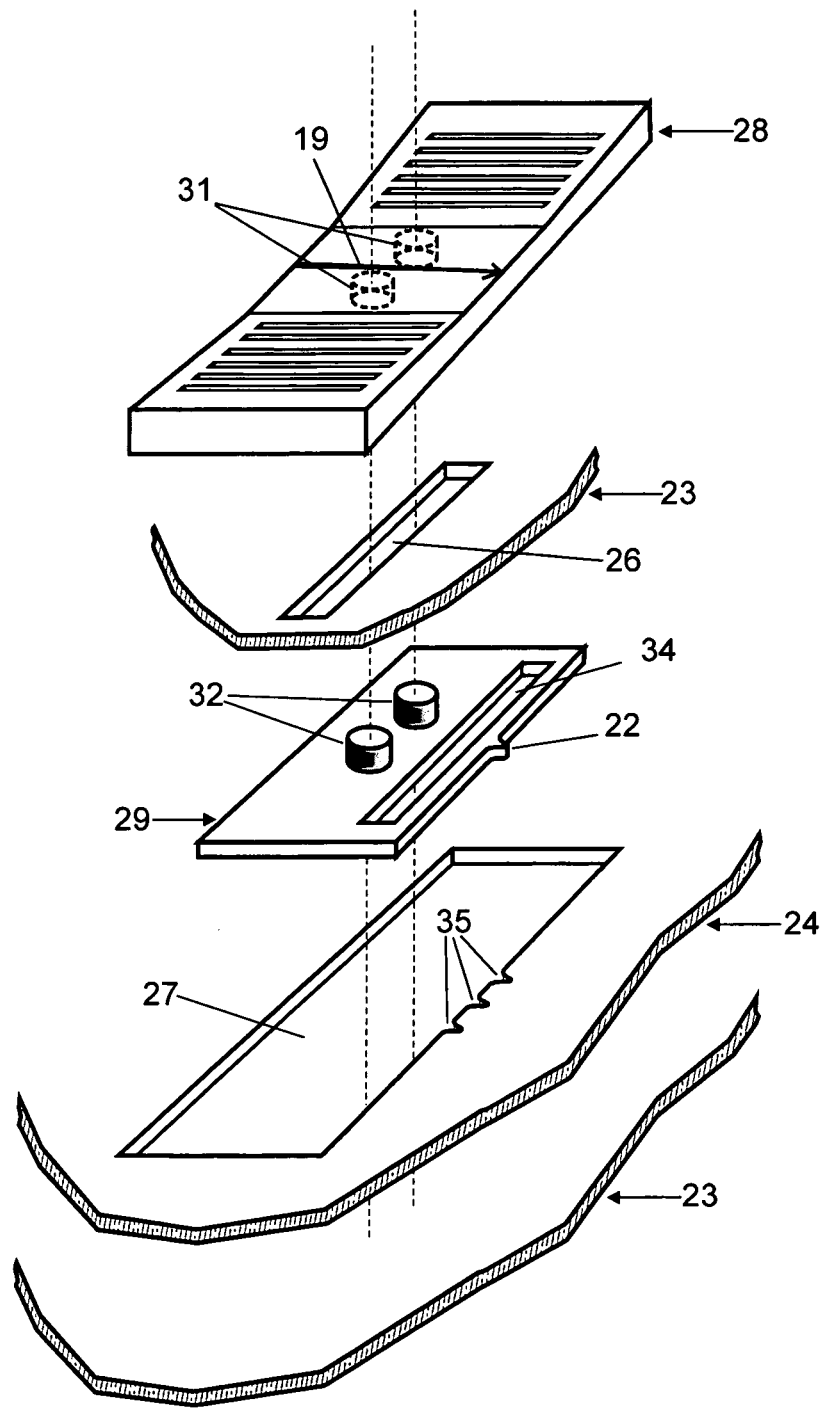
FIG. 6 presents a perspective detailed view of the illustrated guide for the identification of organisms in the field comprising three sequentially assembled sheets with indication of the areas provided for connecting thereupon of the marking mechanism of FIG. 4.

Subsequently and, in order to understand by way of example the mode of assembling the components of a marking mechanism 16 onto a guide for the identification of organisms, FIG. 6 shows the components 28 and 29 of the mechanism 16 in a dismantled form. By reference to FIG. 6, from the bottom upwardly, the interior surface of an external sheet 23 is a compact surface without through holes 26. It is at this section that the intermediate sheet 24 is fixedly mounted, the latter being provided with a centrally located through hole 27 of a rectangular parallelepiped shape. An array of equally sized and evenly spaced recesses 35 are provided along a lateral side of the abovementioned through hole 27. It is within this through-hole 27 that an equally sized component 29 of a marking mechanism 16 is placed in a manner such as to allow a curved protrusion 22 thereof to be resiliently inserted precisely within one of the three above mentioned recesses 35. Then the other exterior sheet 23 is mounted in a manner such that the pair of protrusions 32 of cylindrical shape that are located on the upper surface of the component 29 pass freely through the through hole 26 of the upper sheet 23. It is for this reason that this hole 26 has a width slightly larger than the diameter of the cylindrical protrusions 32. At the same time, these two cylindrical protrusions 32 have a height significantly higher than the thickness of the component 29 of the marking mechanism and therefore they protrude sufficiently forwardly from its upper surface thereby allowing their insertion and their fixedly fitting within the two recesses 31 of similar size and shape that are located onto the bottom of the component 28 wherein protrusions 32 extending forwardly through hole 26 allow for the appropriate assembly of the above illustrative preferred embodiment of the marking mechanism of the invention.

Figure 7:
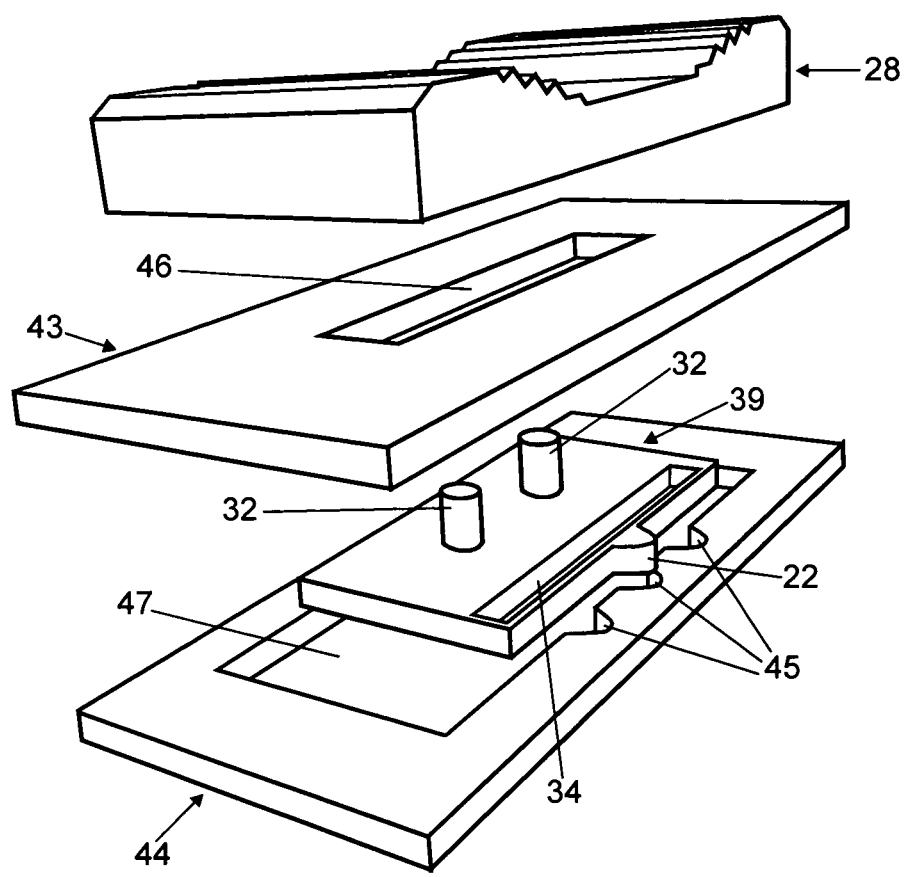
FIG. 7 presents a perspective view of the marking mechanism in accordance with a second illustrative preferred embodiment of the invention dismantled in the constituent parts thereof.

In the second illustrative embodiment of the invention the marking mechanism 16 presented in FIG. 7 may also be produced as an independently assembled portion that may be fitted onto an illustrated guide for the identification of organisms. Such an independently assembled marking mechanism 16 includes a movable member 28, another movable member 39 of a rectangular section provided with a pair of protrusions 32 with dimensions and layout that correspond to the pair of recesses 31 of the movable member 28, a longitudinally extending opening 34 on one side thereof and a curved protrusion 22 in the middle of the side having the longitudinally extending opening 34.

In addition, the marking mechanism 16 includes a surface 44 fixed in relation to the movable part of the marking mechanism, an opening 47 of rectangular section being provided along one side of the surface 44, wherein an array of equally distributed cavities 45 is provided along one side of such opening 44 within which is alternately resiliently fitted the curved protrusion 22 of the movable member 39. The width of the opening 47 corresponds to the width of the movable member 39 and its length is greater than the length of the movable member 39 in order to ensure fitting of the curved protrusion 22 within anyone of the array of cavities 45. Finally, the independently assembled marking mechanism of FIG. 7 includes a surface 43 with a longitudinally extending opening 46 that has a width allowing passing of the protrusions 32 there through; this surface 43 is positioned intermediately between the assembled movable members 28 and 39, which are jointly assembled as a single item. Following insertion of the pair of protrusions 32 of the movable member 39 within the pair of recesses 31 of the movable member 28, the movable member 28 and the movable member 39 of the mechanism move as a single item so that the reciprocating movement of the movable member 28 and the resulting displacement of pointer 19 amongst the positions corresponding to the indications 20 and 21 contained in column 17 adjacently each marking mechanism 16 corresponds to a displacement of the curved protrusion 22 of the movable member 39 in any one of the assembly of cavities 45 of the opening 47 of the fixed surface 44 within which the movable member 39 reciprocates.

The use of the illustrated guide for the identification of organisms of the present invention can be further combined with a broader system of information referring to the organisms encountered in a specific geographical area; this system may consist of printed and/or electronic sources of information, including printed forms and electronic editions such as CD, DVD disks and special dedicated interne sites.

The invention claimed is:

1. Illustrated guide for the identification of organisms in the field comprising at least one sheet (23) whereupon is being printed a plurality of images (14) illustrating organisms encountered in the field, characterized in that a marking mechanism (16) is provided adjacently to each one of said plurality of images (14), a column (17) being provided adjacently to each marking mechanism (16), said column (17) being printed with an indication (20) representative of a conventionally idle position of the marking mechanism (16) and with at least one further characteristic indication (21) being associated with a predetermined information related to the displayed organism, each one of said marking mechanisms (16) comprising a movable member (28) being provided with a pointer (19) arranged so as to point at said indication (20) representative of the conventionally idle position of the marking mechanism (16), wherein displacement of the movable member (28) of a selected marking mechanism so that said pointer (19) thereof points at said at least one further characteristic indication (21) is being performed by the user with a scope of indicating a certain observation of the user in the field, such observation being related to the specific image of this organism of said plurality of images (14) illustrating organisms encountered in the field adjacently to which said selected marking mechanism (16) is located.

2. Use of the illustrated guide for the identification of organisms in the field as claimed in claim 1 for the recordal and storage of information related to the identification by the user in the field of the presence of a specific organism or of a group of specific organisms amongst the organisms depicted in said plurality of images (14) illustrating organisms encountered in the field, said recordal and storage of information being performed through active displacement of the movable member (28) of a selected marking mechanism (16) located adjacently to the image of said specific organism being identified in the field so that said pointer (19) of said selected marking mechanism (16) moves from said conventionally idle position to a position pointing at said at least one or more indications (21) characteristic of the identification of the specific organism being identified in the field, said more indications (21) being associated with predetermined varying degrees of certainty of the identification in the field by the user of the presence of said specific organism or of said group of specific organisms amongst the organisms depicted in said plurality of images (14) illustrating organisms encountered in the field.

3. Illustrated guide for the identification of organisms in the field according to claim 1, characterized in that said movable member (28) of the marking mechanism (16) comprises a pair of recesses (31) onto the bottom surface thereof and is arranged so as to perform a reciprocating movement and in that said marking mechanism (16) further comprises:

a movable member (29, 39) of a rectangular section provided with a pair of protrusions (32) having dimensions and layout that correspond to the dimensions and layout of said pair of recesses (31) of said movable member (28), said movable member (29, 39) being further provided with a longitudinally extending opening (34) along one side thereof and with a curved protrusion (22) at the middle of said side with the longitudinally extending, opening (34);

a surface (24, 44) adapted to remain stationary in relation to said marking mechanism (16) and in relation to said plurality of images (14) illustrating organisms encountered in the field, an opening (27, 47) of rectangular section being provided onto said surface (24, 44), an array of cavities (35, 45) being provided along one side of said opening (27, 47), said curved protrusion (22) being adapted to alternately resiliently fit within said cavities (35, 45), the width of said opening (27, 47) corresponding to the width of said movable member (29, 39) and the length of said opening (27, 47) exceeding the length of said movable member (29, 39) so as to ensure fitting of said curved protrusion (22) within each one of said array of cavities (35, 45), and a surface (23, 43) having a longitudinally extending opening (26, 46) with a width that allows for the passing there through or said pair of protrusions (32), said surface (23, 43) being provided intermediately between said movable member (28) and said movable member (29, 39), wherein, following fitting of said pair of protrusions (32) of said movable member (29, 39) within said pair of recesses (31) of said movable member (28), said movable member (28) and said movable member (29, 39) jointly move as a single item so that the reciprocating movement of said movable member (28) and the resulting displacement of said pointer (19) of the marking mechanism (16) in the positions corresponding to said indications (20, 21) contained in said column (17) adjacently each marking mechanism (16) corresponds to the displacement of said curved protrusion (22) of said movable member (29, 39) within one cavity of said array of cavities (35, 45) of the opening (27, 47) of said surface (24, 44) whereupon reciprocatingly moves said movable member (29, 39).

4. Illustrated guide for the identification of organisms in the field, according to claim 3, comprising said sheet (23) adapted to constitute a card whereupon is being printed a said plurality of images (14) illustrating organisms encountered in the field, characterized in that:

said sheet (23) is provided with a plurality of said longitudinally extending openings (26), each opening (26) being adapted to correspond to one of said plurality of images (14) and to a corresponding marking mechanism (16);

said surface (24, 44) adapted to remain stationary in relation to said marking mechanism (16) and in relation to said plurality of images (14) illustrating organisms encountered in the field is a surface (44) of rectangular section, said surface (44) being attached onto said sheet (23) whereupon is being printed said plurality of images (14) illustrating organisms encountered in the field, each surface (44) being adapted to correspond to one of said plurality of images (14) and to a corresponding one said marking mechanism (16), said plate surface (44) being provided with an said opening (47) of rectangular section, said array of cavities (45) being provided along one side of said opening (47) of rectangular section, said curved protrusion (22) of said movable member (39) being adapted to reciprocatingly move within said opening (47) so as to alternately resiliently fit into one cavity of said array of cavities (45), and, said surface (23, 43) provided intermediately between said movable member (28) and said movable member (39) is a surface (43) provided with said longitudinally extending opening (46) of a width that allows passing of said protrusions (32) of the movable member (39) there through and fitting thereof within said pair of recesses (31) of said movable member (28), said movable member (28) hereinafter moving as a single item jointly with said movable member (39).

5. Illustrated guide for the identification of organisms in the field, according to claim 3, comprising said sheet (23) adapted to constitute a card whereupon is being printed said plurality of images (14) illustrating organisms encountered in the field, characterized in that:

said sheet (23) is provided with a plurality of said longitudinally extending openings (26), each opening (26) being adapted to correspond to one of said plurality of images (14) and to a corresponding marking mechanism (16);

said surface (24, 44) adapted to remain stationary in relation to said marking mechanism (16) and in relation to said plurality or images (14) illustrating organisms encountered in the field is a sheet (24) having dimensions similar to those of said sheet (23) adapted to constitute a card whereupon is being printed a said plurality of images (14) illustrating organisms encountered in the field, said sheet (24) being provided with said openings (27), one said opening (27) for each one of said plurality of images (14) illustrating organisms encountered in the field and each one of the corresponding marking mechanisms (16), each said opening (27) having a rectangular section, said array of cavities (35) being provided along one side of said opening (27) of rectangular section, said curved protrusion (22) or said movable member (29) being adapted to reciprocatingly move within said opening (27) so as to alternately resiliently fit into one cavity of said array of cavities (35), and said surface (23, 43) provided intermediately between said movable member (28) and said movable member (29) is said sheet (23) adapted to constitute a said card whereupon is being printed said plurality of images (14) illustrating organisms encountered in the field, said sheet (23) being provided with a plurality of said longitudinally extending openings (26), one opening (26) for each image (14), each opening (26) having a width that allows passing of said protrusions (32) of the movable member (29) there through and fitting thereof within said pair of recesses (31) or said movable member (28), said movable member (28) hereinafter moving as a single item jointly with said movable member (29).

6. Illustrated guide for the identification of organisms in the field, according to claim 5, characterized in that it comprises a pair of a first and a second said at least one sheet (23), each sheet (23) adapted to constitute said card whereupon is being printed said plurality of images (14) illustrating organisms encountered in the field and a plurality of marking mechanisms (16) corresponding to the plurality of images (14) illustrating organisms encountered in the field imprinted onto each one of said pair of sheets (23) and a sheet (24) adapted to remain stationary in relation to said plurality of marking mechanisms (16) and in relation to said plurality of images (14) illustrating organisms encountered in the field, said sheet (24) having dimensions similar to those of said pair of sheets (23) adapted to constitute said cards whereupon is being printed a said plurality of images (14) illustrating organisms encountered in the field, said sheet (24) being provided with a first array of openings (27) and with an adjacently positioned second array of openings (27), one opening (27) of said first array of openings for each one of said plurality of images (14) illustrating organisms encountered in the field of said first sheet (23), said openings (27) of said first array of openings (27) being arranged in a mode such as to correspond to the positions of the marking mechanisms (16) of the images (14) illustrating organisms encountered in the field of said first sheet (23) and one opening (27) of said adjacently positioned second array of openings (27) for each one of said plurality of images (14) illustrating organisms encountered in the field of said second sheet (23), said openings (27) of said second array of openings (27) being arranged in a mode such as to correspond to the positions of the marking mechanisms (16) of the images (14) illustrating organisms encountered in the field of said second sheet (23) said first sheet (23) abutting onto one surface of said sheet (24) and said second sheet (23) abutting onto the other surface of said sheet (24), each said opening (27) having a rectangular section, said array of cavities (35) being provided along one side of said opening (27) of rectangular section, said curved protrusion (22) of said movable member (29) being adapted to reciprocatingly move within said opening (27) so as to alternately resiliently fit into one cavity of said array of cavities (35).

7. Illustrated guide for the identification of organisms in the field, according to claim 1, characterized in that it further comprises a pair of columns (15, 18) adjacently to each one of said plurality of images (14) illustrating organisms encountered in the field, wherein a codified marking of a predetermined type, different for each one of said plurality of images (14), is printed within said column (15) and an informative text pertinent to each one of said plurality of images (14) is printed within said column (18), and a column (12) positioned on the upper part of said sheet (23) adapted to constitute a card whereupon is printed a plurality of images (14) illustrating organisms encountered in the field wherein an informative text related to the overall display of images (14) is printed within said column (12).

8. Illustrated guide for the identification of organisms in the field, according to the above claim 7, characterized in that it is made from a waterproof material so as to appropriately adapt for use within water.

9. System of providing information and training in relation to organisms encountered in a certain field, characterized in that it employs the illustrated guide of identification of organisms in the field according to claim 1 in combination with printed and/or electronic sources or information, including printed matter and electronic editions, CD disks, DVD disks, internet sites, etc.

10. Method of providing information and training related to organisms encountered in a certain field, characterized in that it comprises:

equipping a user with an illustrated guide for the identification of organisms in the field comprising at least one sheet (23) whereupon has been printed a plurality of images (14) pertinent to organisms encountered in the field with a marking mechanism (16) arranged adjacently to each one of said images (14) and a column (17) adjacently each marking mechanism (16) wherein have been printed an indication (20) typical of an idle position of the marking mechanism (16) and at least one or more indications (21) associated with predetermined information related to the adjacently displayed organism;

use by the user of said illustrated guide for the identification of organisms during his visit in the field for the recordal and storage of his observations by means of said marking mechanisms (16) associated with said images (14), said mechanisms (16) being set through displacement of a movable member (28) thereof incorporating a pointer (19) so that said pointer (19) points at either said indication (20) typical, of the idle position of the marking mechanism (16) or at said at least one or more indications (21) associated with predetermined information resulting from observation of the user during his visit in the field related to the organism displayed adjacently to this marking mechanism (16);

employment of said illustrated guide for the identification of organisms in the field with the information collected during the visit of the user in the field appropriately recorded and stored through movement of the pointers (19) of marking mechanisms (16) adjacently to said images (14) of those organisms observed and recognized with a predetermined higher or smaller degree of certainty in combination with said codified marking of a predetermined type, different for each one of said plurality of images (14), being printed within said corresponding columns (15) and said informative text pertinent to each one of said plurality of images (14) being printed within said corresponding columns (18) and with the assistance of further printed and/or electronic information resources related to the displayed organisms, including printed matter and electronic editions, CD disks, DVD disks, internet sites, etc., directly connected and interactive with said illustrated guide for the identification of organisms in the field;

repetition of successive visits of the user in the field and reference to said printed and/or electronic information resources according to the above with a scope of furthering one's acquaintance and knowledge with the organisms depicted within said illustrated guide for the identification of organisms in the field.

\* \* \* \* \*